(12) United States Patent
Faust et al.

(10) Patent No.: US 10,391,557 B2
(45) Date of Patent: Aug. 27, 2019

(54) CLADDED ARTICLES AND APPLICATIONS THEREOF

(71) Applicant: Kennametal Inc., Latrobe, PA (US)

(72) Inventors: James A. Faust, New Albany, IN (US); Daniel Bourlotos, Taylorsville, KY (US); Qingjun Zheng, Export, PA (US); Michael Meyer, Ligonier, PA (US)

(73) Assignee: KENNAMETAL INC., Latrobe, PA (US)

( * ) Notice: Subject to any disclaimer, the term of this patent is extended or adjusted under 35 U.S.C. 154(b) by 217 days.

(21) Appl. No.: 15/165,877

(22) Filed: May 26, 2016

(65) Prior Publication Data

US 2017/0341148 A1   Nov. 30, 2017

(51) Int. Cl.

| | |
|---|---|
| B22F 7/00 | (2006.01) |
| B22F 7/04 | (2006.01) |
| B32B 15/01 | (2006.01) |
| E21B 43/26 | (2006.01) |
| E21B 34/06 | (2006.01) |
| B22F 1/00 | (2006.01) |
| B22F 7/08 | (2006.01) |

(Continued)

(52) U.S. Cl.
CPC ............ *B22F 7/008* (2013.01); *B22F 1/0014* (2013.01); *B22F 5/10* (2013.01); *B22F 7/04* (2013.01); *B22F 7/08* (2013.01); *B32B 15/01* (2013.01); *E21B 34/06* (2013.01); *E21B 43/26* (2013.01); *B22F 1/0074* (2013.01); *B22F 2007/045* (2013.01); *B22F 2007/066* (2013.01); *B22F 2207/01* (2013.01); *B22F 2301/15* (2013.01); *B22F 2302/10* (2013.01); *B22F 2302/45* (2013.01); *B22F 2304/10* (2013.01)

(58) Field of Classification Search
None
See application file for complete search history.

(56) References Cited

U.S. PATENT DOCUMENTS

| | | | |
|---|---|---|---|
| 2,103,503 A | 12/1937 | White | |
| 2,745,631 A | 5/1956 | Shellman | |

(Continued)

FOREIGN PATENT DOCUMENTS

| | | |
|---|---|---|
| CN | 2861553 Y | 1/2007 |
| CN | 101737317 A | 6/2010 |

(Continued)

OTHER PUBLICATIONS

Non-Final Office Action for U.S. Appl. No. 15/875,758, dated Oct. 9, 2018.

*Primary Examiner* — John J Figueroa
(74) *Attorney, Agent, or Firm* — Larry R. Meenan (57) ABSTRACT

In one aspect, composite articles are described herein employing cobalt-based alloy claddings exhibiting high hardness and wear resistance while maintaining desirable integrity and adhesion to surfaces of metallic substrates. A composite article, in some embodiments, comprises a metallic substrate and a composite cladding metallurgically bonded to one or more surfaces of the metallic substrate, the composite cladding including cobalt-based alloy having a chromium gradient, wherein chromium content increases in a direction from the composite cladding surface to an interface of the composite cladding with the metallic substrate.

30 Claims, 7 Drawing Sheets

(51) Int. Cl.
*B22F 5/10* (2006.01)
*B22F 7/06* (2006.01)

(56) References Cited

U.S. PATENT DOCUMENTS

| | | | |
|---|---|---|---|
| 2,969,951 A | 1/1961 | Walton | |
| 2,982,515 A | 5/1961 | Clinton | |
| 3,063,467 A | 11/1962 | Emmett, Jr. | |
| 4,076,212 A | 2/1978 | Leman | |
| 4,425,699 A | 1/1984 | Nordin | |
| 4,572,298 A | 2/1986 | Weston | |
| 4,911,410 A | 3/1990 | Baker | |
| 4,951,707 A | 8/1990 | Johnson | |
| 4,997,162 A | 3/1991 | Baker | |
| 5,002,834 A * | 3/1991 | Smith | B32B 15/01 148/425 |
| 5,062,450 A | 11/1991 | Bailey | |
| 5,249,600 A | 10/1993 | Blume | |
| 5,275,204 A | 1/1994 | Rogers | |
| 5,345,965 A | 9/1994 | Blume | |
| 5,501,424 A | 3/1996 | Williams | |
| 6,139,599 A | 10/2000 | Takahashi | |
| 6,382,940 B1 | 5/2002 | Blume | |
| 6,464,749 B1 | 10/2002 | Kawase | |
| 6,641,779 B2 | 11/2003 | Kawase | |
| 6,712,871 B2 | 3/2004 | Oh | |
| 6,802,883 B2 * | 10/2004 | Henmi | C22C 33/0207 419/12 |
| 6,916,444 B1 * | 7/2005 | Liang | C22C 38/02 148/321 |
| 6,951,579 B2 | 10/2005 | Koyama | |
| 6,955,181 B1 | 10/2005 | Blume | |
| 7,070,166 B1 | 7/2006 | Blume | |
| 7,273,508 B2 | 9/2007 | Sato | |
| 7,478,673 B2 | 1/2009 | Boyd | |
| 7,540,470 B1 | 6/2009 | Blume | |
| 7,572,312 B2 | 8/2009 | Kawata | |
| D607,091 S | 12/2009 | Weston | |
| 7,661,935 B2 | 2/2010 | Kellar | |
| D614,271 S | 4/2010 | Weston | |
| 7,726,026 B1 | 6/2010 | Blume | |
| 8,210,542 B1 | 7/2012 | Gilstad | |
| 8,221,517 B2 | 7/2012 | Mirchandani | |
| 8,317,498 B2 | 11/2012 | Gambier et al. | |
| D700,682 S | 3/2014 | Bayyouk | |
| 8,707,853 B1 | 4/2014 | Dille | |
| 8,790,439 B2 | 7/2014 | Mirchandani | |
| 8,844,903 B2 | 9/2014 | Takahashi | |
| 8,870,554 B2 | 10/2014 | Kent | |
| 8,915,722 B1 | 12/2014 | Blume | |
| 9,169,707 B1 | 10/2015 | Gilstad | |
| 9,175,584 B2 | 11/2015 | Lee | |
| 9,222,154 B2 | 12/2015 | Dolman | |
| D748,228 S | 1/2016 | Bayyouk | |
| 9,273,385 B2 | 3/2016 | Dolman | |
| D754,817 S | 4/2016 | Dille | |
| 9,359,921 B2 | 6/2016 | Hashimoto | |
| 9,435,454 B2 | 9/2016 | Blume | |
| 9,581,056 B2 | 2/2017 | Koyama | |
| 9,631,739 B2 | 4/2017 | Belshan | |
| D796,632 S | 9/2017 | Bayyouk | |
| D802,104 S | 11/2017 | Nagahamaya | |
| 9,822,894 B2 | 11/2017 | Bayyouk | |
| 9,849,532 B2 * | 12/2017 | Zheng | B23K 1/0008 |
| 9,927,036 B2 | 3/2018 | Dille | |
| 2004/0234404 A1 | 11/2004 | Vicars | |
| 2007/0095443 A1 * | 5/2007 | Dolman | C21D 5/04 148/542 |
| 2009/0278069 A1 | 11/2009 | Blanco | |
| 2011/0079302 A1 | 4/2011 | Hawes | |
| 2011/0278490 A1 | 11/2011 | Maruno | |
| 2012/0286183 A1 | 11/2012 | McCarty | |
| 2013/0017108 A1 | 1/2013 | Kellar et al. | |
| 2013/0020521 A1 | 1/2013 | Byrne | |
| 2013/0037179 A1 * | 2/2013 | Dolman | C21D 5/04 148/542 |
| 2013/0181154 A1 | 7/2013 | Robison | |
| 2013/0202458 A1 | 8/2013 | Byrne | |
| 2013/0259733 A1 * | 10/2013 | Lee | F01L 3/02 419/10 |
| 2013/0319220 A1 | 12/2013 | Luharuka et al. | |
| 2014/0070127 A1 | 3/2014 | Blume | |
| 2014/0124692 A1 | 5/2014 | Baumann | |
| 2015/0144826 A1 | 5/2015 | Bayyouk et al. | |
| 2015/0219096 A1 | 8/2015 | Jain et al. | |
| 2016/0101600 A1 * | 4/2016 | Potts | C08K 3/32 428/419 |
| 2016/0238156 A1 | 8/2016 | Hubenschmidt | |
| 2017/0009890 A1 | 1/2017 | Vu | |
| 2017/0059052 A1 | 3/2017 | Abouelleil | |
| 2017/0067459 A1 | 3/2017 | Bayyouk | |
| 2017/0089228 A1 | 3/2017 | Shimada | |
| 2017/0145875 A1 | 5/2017 | Hashimoto | |
| 2017/0298932 A1 | 10/2017 | Wagner | |

FOREIGN PATENT DOCUMENTS

| | | |
|---|---|---|
| CN | 202001288 U | 10/2011 |
| CN | 106996368 A | 8/2017 |
| GB | 855956 A | 12/1960 |
| NL | 1020775 C2 | 12/2003 |
| WO | 2015077001 A1 | 5/2015 |
| WO | WO2016201020 A1 | 12/2016 |

* cited by examiner

CLADDED ARTICLES AND APPLICATIONS THEREOF

FIELD

The present application relates to cladded industrial articles and, in particular, to frack valves having composite alloy claddings metallurgically bonded thereto.

BACKGROUND

Claddings are often applied to equipment subjected to harsh environments or operating conditions in efforts to extend the useful lifetime of the equipment. Various cladding identities and constructions are available depending on the mode of failure to be inhibited. For example, wear resistant, erosion resistant and corrosion resistant claddings have been developed for metallic substrates. Moreover, metal or alloy claddings can be applied to metallic substrates by a variety of techniques including weld overlay, plasma transferred arc, thermal spray, laser cladding, infrared cladding, induction cladding or sintering.

A significant problem encountered in cladding applications is premature failure or degradation of the cladding. Claddings of metallic substrates can fail according to a variety of mechanisms, including delamination and cracking/fracture. In some cases, a cladded metal substrate is subjected to thermal cycling that can impair the bonding of the cladding to the substrate. In some applications, for example, the metal substrate is subjected to a post-coat heat treatment such as normalizing in order to improve the mechanical properties of the substrate, wherein the post-coat heat treatment fractures the cladding. Moreover, in some cases, shrinkage of the cladding during deposition can induce cracking and/or delamination. Such shrinkage is exacerbated by metallic articles having complex geometries, including frack valves.

Figure 1A:
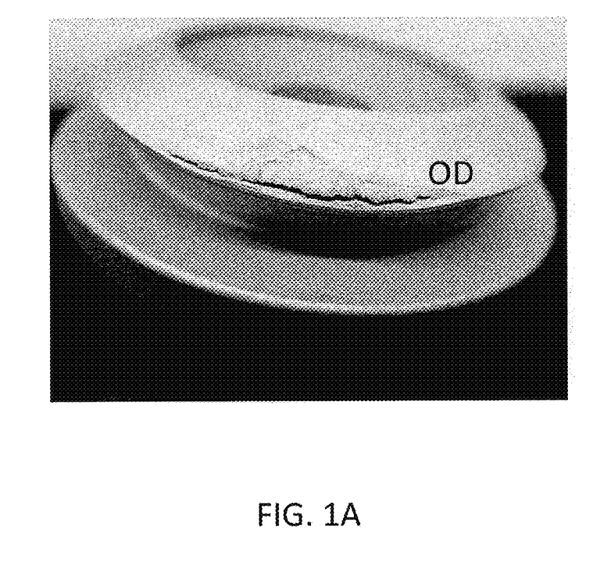
FIG. 1A illustrates cracking of a sintered STELLITE®12 cladding along an outer diameter surface of a frack valve.
Figure 1B:
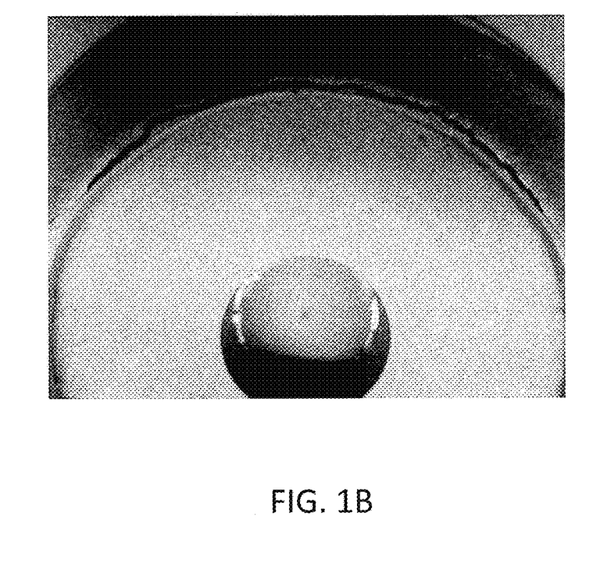
FIG. 1B illustrates cracking of a sintered STELLITE®12 cladding along an inner diameter surface of a frack valve.

Frack valves are employed in high pressure positive displacement or reciprocating pumps often used in hydraulic fracturing and/or other earth boring applications. Given this high wear environment, frack valves can benefit from erosion resistant claddings. However, complex frack valve geometry places restrictions on cladding techniques and cladding composition. Hardfacing alloys applied by sintering, for example, exhibit unacceptable cracking and delamination along seat surfaces. FIGS. 1A and 1B illustrate such cracking for sintered cobalt alloy STELLITE®12 applied to a frack valve. Cracking and delamination occurs along the ID and OD edges of the seat surfaces. These defects can frustrate the use of hardfacing alloys having high hardness and high wear resistance.

SUMMARY

In view of the foregoing disadvantages, composite alloy claddings for various metallic substrates including frack valves are provided herein, the composite alloy claddings exhibiting high hardness and wear resistance while maintaining desirable integrity and adhesion to surfaces of the metallic substrates. In one aspect, a composite article described herein comprises a metallic substrate and a composite cladding metallurgically bonded to one or more surfaces of the metallic substrate, the composite cladding including cobalt-based alloy having a chromium gradient, wherein chromium content increases in a direction from the composite cladding surface to an interface of the composite cladding with the metallic substrate. The cobalt-based alloy forming the composite cladding can further comprise one or more compositional gradients in addition to the chromium gradient. For example, the cobalt-based alloy may also comprise a tungsten gradient, wherein tungsten content increases in the direction from the composite cladding surface to the interface.

In another aspect, methods of making composite articles are described herein. Briefly, a method of making a composite article comprises providing a metallic substrate and arranging an assembly over the metallic substrate, the assembly including a composite powder composition including infiltration cobalt powder alloy and base cobalt powder alloy having a solidus temperature higher than the infiltration cobalt powder alloy. The assembly is heated to infiltrate the base cobalt powder alloy with molten infiltration cobalt alloy to provide a composite cladding metallurgically bonded to the metallic substrate. As described further herein, the assembly can comprise one or more organic carriers for the infiltration cobalt powder alloy and the base cobalt powder alloy.

These and other embodiments are described in greater detail in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Composite Articles

In one aspect, composite articles are described herein employing cobalt-based alloy claddings exhibiting high hardness and wear resistance while maintaining desirable integrity and adhesion to surfaces of metallic substrates. Such articles can find application in a variety of high wear environments, including oil and gas production as well as mining. A composite article, in some embodiments, comprises a metallic substrate and a composite cladding metallurgically bonded to one or more surfaces of the metallic substrate, the composite cladding including cobalt-based alloy having a chromium gradient, wherein chromium content increases in a direction from the composite cladding surface to an interface of the composite cladding with the metallic substrate.

In some embodiments, the cobalt-based alloy forming the composite cladding further comprises one or more compositional gradients in addition to the chromium gradient. For example, the cobalt-based alloy may also comprise a tungsten gradient, wherein tungsten content increases in the direction from the composite cladding surface to the interface. Moreover, a nickel and/or silicon gradients may be present in the cobalt-based alloy, wherein nickel and/or silicon content decreases in direction from the composite cladding surface to the interface.

Figure 2:
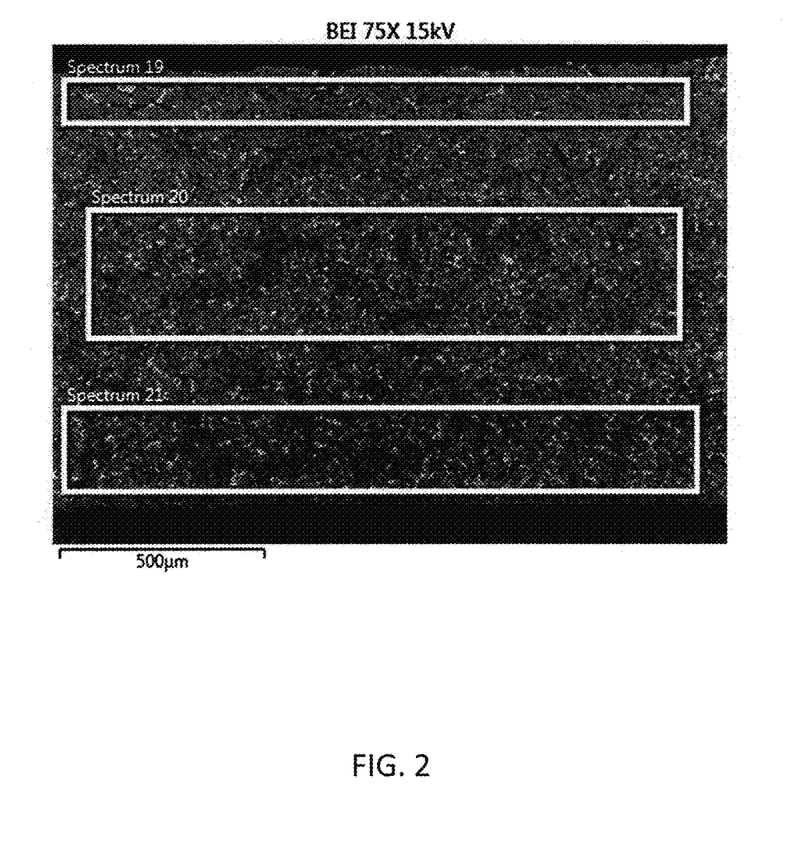
FIG. 2 is a cross-sectional scanning electron microscopy (SEM) image of a composite cladding according to one embodiment described herein illustrating various elemental gradients of the cobalt-based alloy.

FIG. 2 is a cross-sectional SEM of a composite cladding according to one embodiment described herein illustrating various elemental gradients of the cobalt-based alloy. As provided in FIG. 2, energy-dispersive x-ray spectroscopy (EDX) was used to determine elemental composition along the cross-section of the cobalt-based alloy composite cladding. Three regions were sampled along the cross-section from the cladding surface (Spectrum 19) to adjacent the interface with the metallic substrate (Spectrum 21). Results of the analysis are provided in Table I.

TABLE I

Composite Cladding Cross-Sectional Composition (wt. %)

| Element | Spectrum 19 | Spectrum 20 | Spectrum 21 |
|---|---|---|---|
| Carbon | 3.86 | 5.10 | 4.81 |
| Silicon | 1.28 | 0.95 | 0.87 |
| Chromium | 24.69 | 28.69 | 29.15 |
| Iron | 2.16 | 2.61 | 2.44 |
| Cobalt | 53.80 | 49.16 | 48.92 |
| Nickel | 6.23 | 4.46 | 4.27 |
| Tungsten | 7.98 | 9.04 | 9.55 |
| Total | 100.00 | 100.00 | 100.00 |

Figure 3:
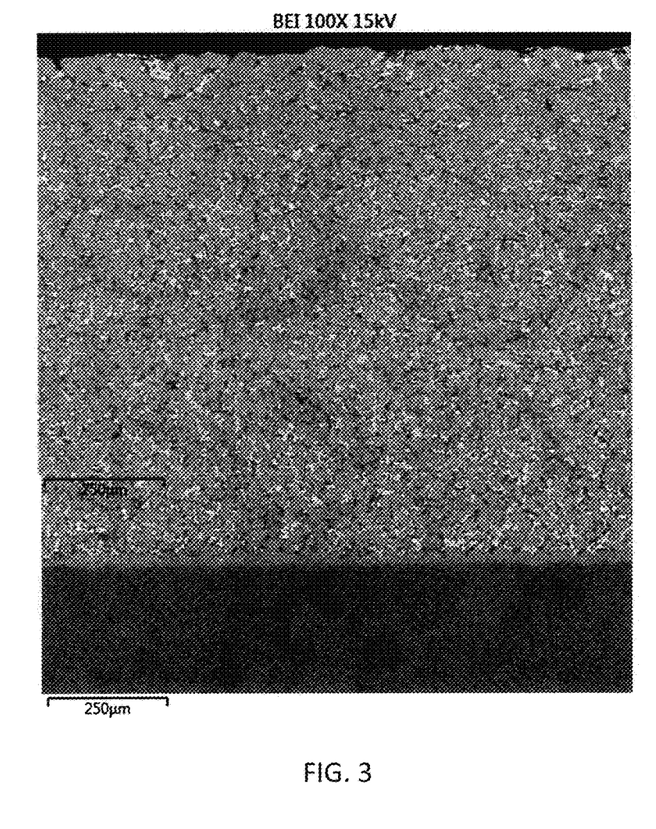
FIG. 3 is a cross-sectional SEM of a composite cladding according to one embodiment wherein $M_6C$ carbides are present in the cobalt-based alloy.

Cobalt-based alloy of composite cladding architectures described herein can also comprise one or more metal carbide phases. For example, the cobalt-based alloy can comprise $M_6C$ carbides wherein M primarily includes tungsten, molybdenum, cobalt or mixtures thereof. M may additionally include chromium, cobalt, iron and/or nickel in lesser amounts. When present, the $M_6C$ carbides can be dispersed throughout the cobalt-based alloy cladding. In some embodiments, $M_6C$ carbides are present at a higher concentration in the composite cladding bulk relative to the cladding surface or region(s) proximate to the cladding surface. Regions proximate the cladding surface are generally within 200-500 µm of the cladding surface depending on cladding thickness, processing and compositional parameters. FIG. 3 is a cross-sectional SEM of a composite cladding according to one embodiment wherein $M_6C$ carbides are present in the cobalt-based alloy. As illustrated in FIG. 3, the $M_6C$ carbides (bright phase) are present at a higher concentration in the composite cladding bulk relative to the surface.

Figure 4:
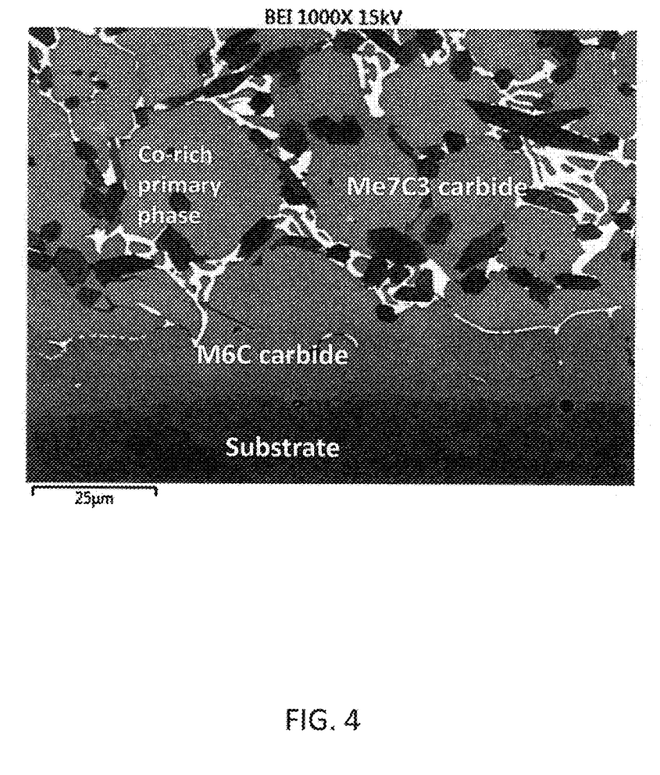
FIG. 4 is an SEM of a section of a composite cladding according to one embodiment described herein illustrating the present of various metal carbide phases.

In some embodiments, $Me_7C_3$ carbides are also present in the cobalt-based alloy of the cladding, wherein Me is primarily chromium. Me can also include cobalt, iron and/or tungsten in lesser amounts. $Me_7C_3$ carbides and $M_6C$ carbides generally precipitate at grain boundaries of the cobalt-rich primary phase. FIG. 4 is an SEM of a section of a composite cladding according to one embodiment described herein. As illustrated in FIG. 4, $M_6C$ carbides (bright phase) and $Me_7C_3$ carbides (dark phase) precipitate at grain boundaries of the Co-rich primary phase (grey). The $M_6C$ and $Me_7C_3$ carbides each have irregular morphology.

Figure 5A:
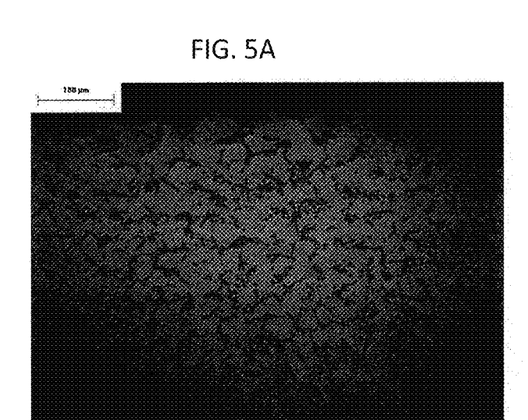
FIGS. 5A-5C are SEMs of various sections of a composite cladding according to some embodiments described herein.
Figure 5B:
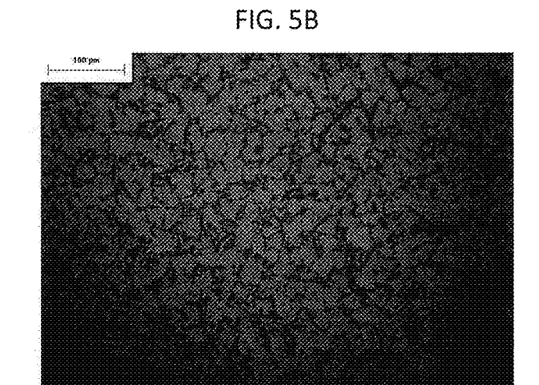
Figure 5C:
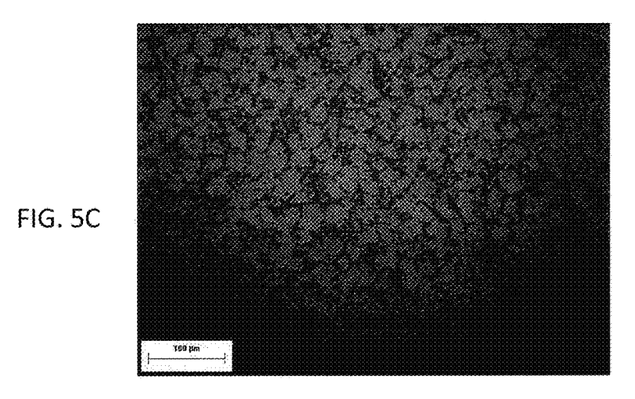

Additionally, composite claddings described herein can exhibit a grain size gradient. For example, grain size of the composite cladding can decrease in a direction from the cladding surface to the cladding body. FIG. 5A is an SEM of a composite cladding near the cladding surface while FIG. 5B is an SEM of the cladding center and FIG. 5C is an SEM near the cladding interface with the metallic substrate. Grain size of the composite cladding in FIG. 5A is coarser than in FIGS. 5B and 5C.

Figure 6:
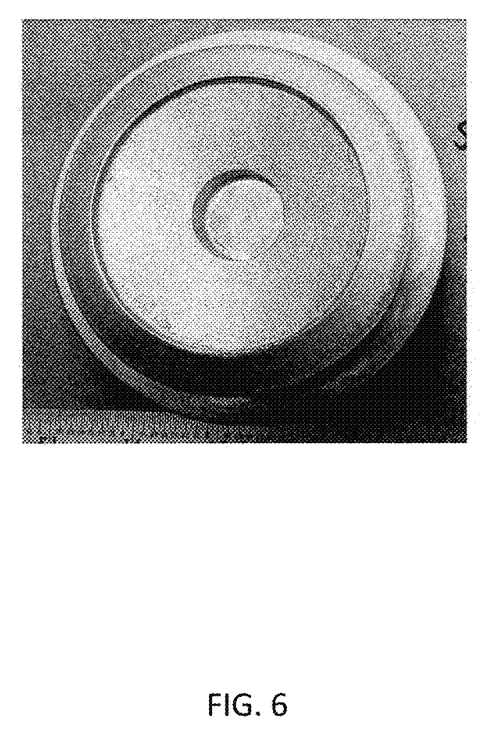
FIG. 6 illustrates a frack valve comprising a composite cladding having composition and properties described herein.

The composite cladding comprising cobalt-based alloy also exhibits desirable properties including, but not limited to, density, hardness, wear resistance and thickness. In some embodiments, the composite cladding is fully dense or substantially fully dense. The composite cladding, for example, can generally have porosity less than 3 vol. % or less than 2 vol. %. Moreover, the composite cladding can be free of cracks at interfaces with the metallic substrate. For example, the composite cladding can be free of cracks along metallic substrate surfaces of complex geometry, such as the inner and/or outer diameter surfaces of a frack valve. FIG. 6 illustrates a frack valve comprising a composite cladding having composition and properties described herein. As illustrated in FIG. 6, cracking does not occur along the inner diameter and outer diameter surfaces of the valve as depicted in FIGS. 1A and 1B. Compositional properties of composite claddings described herein can resist shrinkage during deposition and cooling, thereby inhibiting or precluding crack formation. These compositional properties are not available in the sintered STELLITE®12 claddings illustrated in FIGS. 1A and 1B. The crack-free morphology, in some embodiments, can persist subsequent to thermal cycling or further thermal treatment of the coated article, such as heat treatments employed to restore the mechanical properties of the underlying substrate after coating.

Composite claddings described herein can exhibit hardness of at least 350 kg/mm$^2$ in HV200gf. HV200gf refers to Vickers Hardness using a 200 gram-force load. The microhardness equipment is certified according to ASTM E 384—Standard Methods for Knoop and Vickers Hardness Materials. In some embodiments, the composite cladding has hardness of 400 to 1000 kg/mm$^2$ in HV200gf. Additionally, composite claddings described herein can exhibit a hardness gradient. For example, hardness can increase in a direction from the composite cladding surface to the interface with the metallic substrate. However, in some embodiments, hardness initially decreases from the composite cladding surface to a transition depth. Once the transition depth is reached, hardness of the composite cladding increases in a direction toward the interface with the metallic substrate. The transition depth, in some embodiments, is 200-500 µm from the composite cladding surface.

Composite claddings may also exhibit advantageous abrasion wear resistance. In some embodiments, the composite cladding has an abrasion resistance factor (ARF) of at least 30 according to ASTM G65 Standard Test Method for Measuring Abrasion Using the Dry Sand/Rubber Wheel, Procedure A (1000/AVL). A sintered alloy coating described herein may also exhibit an ARF selected from Table III.

TABLE III

| Composite Cladding ARF (1000/AVL) ASTM G65, Proc. A |
|---|
| 30-55 |
| 35-50 |
| 35-45 |
| 40-50 |

As described herein, the composite cladding is metallurgically bonded to the metallic substrate. In some embodiments, a transition region can exist at the interface of the composite cladding and the metallic substrate. The interfacial transition region can generally have thickness less than 100 μm, such as 10-75 μm.

Composite claddings described herein can also have any desired thickness. For example, a composite cladding can have thickness of 100 μm to 5 mm. In some embodiments, a composite cladding has thickness of 200 μm to 2 mm. Moreover, composite claddings can be applied to any metallic substrate not inconsistent with the objectives of the present invention. Metallic substrates, in some embodiments, are parts used in oil well and/or gas drilling, petrochemical, power generation, food and pet food industries as well as general engineering applications involving wear, abrasion, corrosion and/or high temperature. For example, a metallic substrate can be a frack valve.

II. Methods of Making Composite Articles

In another aspect, methods of making composite articles are described herein. A method of making a composite article comprises providing a metallic substrate and arranging an assembly over the metallic substrate, the assembly including a composite powder composition including infiltration cobalt powder alloy and base cobalt powder alloy having a solidus temperature higher than the infiltration cobalt powder alloy. The assembly is heated to infiltrate the base cobalt powder alloy with molten infiltration cobalt alloy to provide a composite cladding metallurgically bonded to the metallic substrate. In some embodiments, the assembly comprises one or more organic carriers for the infiltration cobalt powder alloy and the base cobalt powder alloy.

Turning now to specific components, the assembly includes a composite powder composition including infiltration cobalt powder alloy and base cobalt powder alloy having a solidus temperature higher than the infiltration cobalt powder alloy. Infiltration cobalt powder alloy and base cobalt powder alloy can have compositional parameters generally selected from Table IV, with the provision that the compositional parameters of the base cobalt powder alloy provide a solidus temperature higher than the infiltration cobalt powder alloy. The infiltration cobalt powder alloy, for example, can comprise higher amounts of boron, carbon and/or silicon relative to the base cobalt powder alloy, thereby facilitating melting at lower temperatures and infiltration processes described herein.

TABLE IV

| Cobalt powder alloys | |
|---|---|
| Element | Amount (wt. %) |
| Chromium | 15-32 |
| Tungsten | 6-12 |
| Molybdenum | 0-10 |
| Nickel | 0-20 |
| Iron | 0-5 |
| Manganese | 0-2 |
| Silicon | 0-5 |
| Vanadium | 0-5 |
| Carbon | 0.5-3 |
| Boron | 0-3 |
| Copper | 0-2 |
| Cobalt | Balance |

In some embodiments, for example, base cobalt powder alloy can have compositional parameters of Co-(25-35)% Cr-(5-15)% W-(0-3)% Ni-(0-3)% Fe-(0-2)% Mn-(0-2)% Si-(0.1-2)% C while the infiltration cobalt powder alloy has compositions parameters of Co-(15-20)% Cr-(5-15)% W-(0-2)% Mo-(10-20)% Ni-(0-3)% Fe-(0-1)% Mn-(2-5)% Si-(0.5-2)% C-(1-3)% B.

Infiltration cobalt powder alloy and base cobalt powder alloy can have any particle size not inconsistent with the objectives of the present invention. In some embodiments, these cobalt powder alloy compositions have an average particle size of 20 μm to 120 μm. Further, the cobalt powder alloys can demonstrate bi-modal or multi-modal size distributions.

As described herein, the assembly comprises one or more organic carriers for the infiltration cobalt powder alloy and the base cobalt powder alloy. In some embodiments, for example, a first organic carrier is provided for the infiltration cobalt powder alloy and a second organic carrier is provided for the base cobalt powder alloy. In this way, the assembly can exhibit a layered construction when arranged over one or more surfaces of the metallic substrate. In some embodiments, for example, the second organic carrier and the base cobalt powder alloy are arranged between the metallic substrate and the first organic carrier and the infiltration cobalt powder alloy. Alternatively, the first organic carrier and the infiltration cobalt powder alloy are arranged between the metallic substrate and the second organic carrier and the base cobalt powder alloy. In further embodiments, the infiltration cobalt powder alloy and base cobalt powder alloy are disposed in the same organic carrier.

Suitable organic carriers can include solid-phase organic compositions. Solid-phase organic compositions can comprise one or more polymeric species. In some embodiments, flexible polymeric sheets are employed as carriers for the infiltration cobalt powder alloy and base cobalt powder alloy. For example, a flexible polymeric sheet or cloth can generally have a thickness of 0.2-4 mm or 1-2 mm. Any polymeric species operable to adopt a fiber or filament morphology can be used in matrix construction. Suitable polymeric species can include fluoropoymers, polyamides, polyesters, polyolefins or mixtures thereof. In some embodiments, for example, the fibrous polymeric matrix is formed of fibrillated polytetrafluoroethylene (PTFE). In such embodiments, the PTFE fibers or fibrils can provide an interconnecting network matrix in which the infiltration cobalt powder alloy and/or base cobalt powder alloy are dispersed and trapped. Moreover, fibrillated PTFE can be combined with other polymeric fibers, such as polyamides and polyesters to modify or tailor properties of the fibrous matrix.

For example, infiltration cobalt powder alloy and/or base cobalt powder alloy can be mixed with 3-15 vol. % PTFE and mechanically worked to fibrillate the PTFE and trap the powder alloy. Mechanical working can include rolling, ball milling, stretching, elongating, spreading or combinations thereof. In some embodiments, the sheet comprising the powder alloy is subjected to cold isostatic pressing. The resulting sheet can have a low elastic modulus and high green strength. In some embodiments, a sheet comprising organic binder and infiltration cobalt powder alloy and/or base cobalt powder alloy is produced in accordance with the disclosure of one or more of U.S. Pat. Nos. 3,743,556, 3,864,124, 3,916,506, 4,194,040 and 5,352,526, each of which is incorporated herein by reference in its entirety. The polymeric sheets can be arranged over the metallic substrate surface as described herein to form the assembly.

In alternative embodiments, suitable organic carrier can include liquid phase carriers. In some embodiments, infiltration cobalt powder alloy and/or base cobalt powder alloy is placed in a liquid organic carrier and applied to the metallic substrate. Application can be spraying, brushing, rolling or combinations thereof. Single or multiple layers of infiltration cobalt powder alloy and base cobalt powder alloy can be applied via liquid organic carrier.

Once arranged over the metallic substrate, the assembly is heated to provide the composite cladding metallurgically bonded to the metallic substrate. Organic carrier of the infiltration cobalt powder alloy and base cobalt powder alloy is decomposed or burned off during the heating process. The metallic substrate and assembly comprising the composite powder composition can be heated in vacuum or under inert or reducing atmosphere to a temperature and for a time period sufficient to infiltrate the base cobalt powder alloy with molten infiltration cobalt alloy to provide the composite cladding metallurgically bonded to the metallic substrate. Generally, the furnace is heated to temperatures of 1150° C. to 1230° C. and maintained at temperature for a time period of 30 minutes to 4 hours under vacuum, partial pressure or inert atmosphere. As described herein, the base cobalt powder alloy has a higher solidus temperature than the infiltration cobalt powder alloy. In some embodiments, furnace temperatures are not sufficient for the base cobalt powder alloy to undergo melting. In other embodiments, furnace temperatures are sufficient for the base cobalt powder alloy to undergo limited or partial melting. The resulting cladded article may subsequently be heat treated to restore any properties of the metallic substrate lost during the cladding process.

Additionally, the composite powder composition may further comprise hard particles of metal carbides, metal nitrides, metal carbonitrides, metal borides, metal silicides, cemented carbides, cast carbides, intermetallic compounds or other ceramics or mixtures thereof. In some embodiments, metallic elements of hard particles comprise aluminum, boron, silicon and/or one or more metallic elements selected from Groups IVB, VB, and VIB of the Periodic Table. Groups of the Periodic Table described herein are identified according to the CAS designation. In some embodiments, for example, hard particles comprise carbides of tungsten, titanium, chromium, molybdenum, zirconium, hafnium, tanatalum, niobium, rhenium, vanadium, boron or silicon or mixtures thereof. Hard particles, in some embodiments, comprise nitrides of aluminum, boron, silicon, titanium, zirconium, hafnium, tantalum or niobium, including cubic boron nitride, or mixtures thereof. Additionally, in some embodiments, hard particles comprise borides such as titanium di-boride, $B_4C$ or tantalum borides or silicides such as $MoSi_2$ or $Al_2O_3$—SiN. Hard particles can comprise crushed cemented carbide, crushed carbide, crushed nitride, crushed boride, crushed silicide, or other ceramic particle reinforced metal matrix composites or combinations thereof.

Hard particles can have any size not inconsistent with the objectives of the present invention. In some embodiments, hard particles have a size distribution ranging from about 0.1 μm to about 1 mm. Hard particles can also demonstrate bimodal or multi-modal size distributions. Hard particles can also have any desired shape or geometry. In some embodiments, hard particles have spherical, elliptical or polygonal geometry. Hard particles, in some embodiments, have irregular shapes, including shapes with sharp edges.

Composite claddings produced according to methods described herein can have any composition, properties and features described in Section I hereinabove. For example, the composite cladding can exhibit one or more of the elemental gradients described in Section I as well as $M_6C$ carbides and/or $Me_7C_3$ carbides dispersed therein. Additionally, non-limiting examples of metallic substrates for receiving composite claddings according to methods described herein are described in Section I above.

These and other embodiments are further illustrated by the following non-limiting example.

EXAMPLE 1

Cladded Frack Valve

A cladded frack valve was produced according to the follow procedure. −325 mesh infiltration cobalt powder alloy having the nominal composition of 18-20% chromium, 8-10% tungsten, 12-15% nickel, 1.5-2.5% boron, 1-3% iron, 2-4% silicon, 0-1% manganese, 0.5-2% carbon and the balance cobalt by weight was mixed and blended with 6% by volume of PTFE. The resulting powder mixture was mechanically worked to trap the alloy particles into a cloth-like flexible sheet.

−325 mesh base cobalt powder alloy having the nominal composition of 27-31% chromium, 8-10 wt. % tungsten, 0-3% nickel, 1-2% silicon, 0-1% manganese, 0-3% iron, 1-2% carbon and the balance cobalt by weight was mixed and blended with 6% by volume of PTFE. The resulting powder mixture was mechanically worked to trap the alloy particles into a cloth-like flexible sheet.

The cloth-like flexible sheet comprising the base cobalt powder alloy was adhered to wear surfaces of the frack valve, including surfaces where the frack valve interfaces with the valve seat. The cloth-like flexible sheet comprising the infiltration cobalt powder alloy was arranged over and adhered to the flexible sheet including the base cobalt alloy powder to complete the assembly. The frack valve and associated assembly were placed in a vacuum furnace, the vacuum furnace being heated to a temperature of 1170° C. to 1230° C. for a time period of 0.5-2 hrs. to provide a substantially fully dense composite cladding metallurgically bonded to frack valve surfaces. FIG. 6 illustrates the cladded frack valve.

Figure 7:
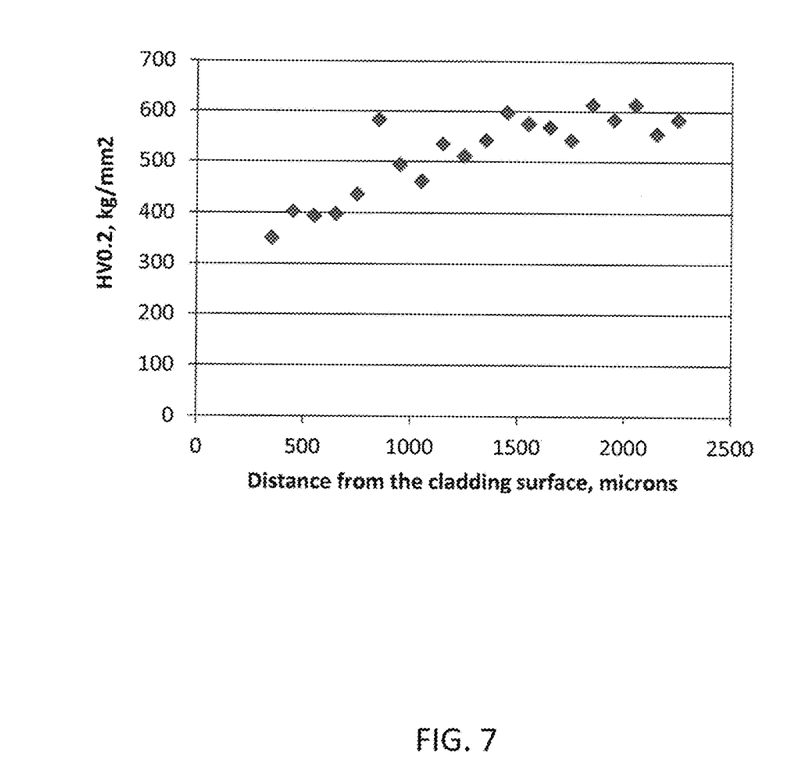
FIG. 7 illustrates a hardness gradient of a composite cladding according to some embodiments described herein.

Compositional and microstructural analysis of the composite cladding was consistent with FIGS. 1-4 described herein. Further, hardness according to ASTM E 384 was measured along the cross-sectional thickness of the cladding. As provided in FIG. 7, the composite cladding exhibited a hardness gradient in a direction from the cladding surface to the interface with the frack valve.

Various embodiments of the invention have been described in fulfillment of the various objects of the invention. It should be recognized that these embodiments are merely illustrative of the principles of the present invention.

Numerous modifications and adaptations thereof will be readily apparent to those skilled in the art without departing from the spirit and scope of the invention.

The invention claimed is:

1. A composite article comprising:
   a metallic substrate; and
   a composite cladding metallurgically bonded to one or more surfaces of the metallic substrate, the composite cladding including cobalt-based alloy having a chromium gradient, wherein chromium content increases in a direction from the composite cladding surface to an interface of the composite cladding with the metallic substrate.

2. The composite article of claim 1, wherein the cobalt-based alloy further comprises a tungsten gradient, wherein tungsten content increases in the direction from the composite cladding surface to the interface.

3. The composite article of claim 1, wherein the cobalt-based alloy further comprises a nickel gradient, wherein nickel content decreases in the direction from the composite cladding surface to the interface.

4. The composite article of claim 1, wherein the cobalt-based alloy comprises $M_6C$ carbides dispersed therein, wherein M includes tungsten, molybdenum or mixtures thereof.

5. The composite article of claim 4, wherein the $M_6C$ carbides are present at higher concentration in the composite cladding bulk relative to the composite cladding surface.

6. The composite article of claim 5, wherein the cobalt-based alloy comprises $Me_7C_3$ carbides dispersed therein, wherein Me includes chromium, cobalt or mixtures thereof.

7. The composite article of claim 1, wherein the composite cladding has hardness of at least 350 HV200gf according to ASTM E 384—Standard Methods for Knoop and Vickers Hardness Materials.

8. The composite article of claim 1, wherein the composite cladding has hardness ranging from 400-1000 kg/mm² HV200g according to ASTM E 384—Standard Methods for Knoop and Vickers Hardness Materials.

9. The composite article of claim 1, wherein the composite cladding has an abrasion resistance of at least 35 ARF determined according to ASTM G65 Standard Test Method for Measuring Abrasion Using the Dry Sand/Rubber Wheel, Procedure A (1000/AVL).

10. The composite article of claim 1, wherein the composite cladding has an abrasion resistance of 30-55 ARF determined according to ASTM G65 Standard Test Method for Measuring Abrasion Using the Dry Sand/Rubber Wheel, Procedure A (1000/AVL).

11. The composite article of claim 1, wherein the metallic substrate is a frack valve.

12. The composite article of claim 11, wherein the composite cladding is free of cracks at interfaces with the frack valve surfaces.

13. The composite article of claim 1, wherein the composite cladding has thickness of 100 μm to 2 mm.

14. The composite article of claim 1, wherein the composite cladding has porosity less than 2 vol. %.

15. A method of making a composite article comprising:
    providing a metallic substrate;
    arranging an assembly over one or more surfaces of the metallic substrate, the assembly including a composite powder composition including infiltration cobalt powder alloy and base cobalt powder alloy having a solidus temperature higher than the infiltration cobalt powder alloy; and
    heating the assembly to infiltrate the base cobalt powder alloy with molten infiltration cobalt alloy to provide a composite cladding metallurgically bound to the metallic substrate.

16. The method of claim 15, wherein the assembly comprises one or more organic carriers for the infiltration cobalt powder alloy and the base cobalt powder alloy.

17. The method of claim 16, wherein the assembly comprises a first organic carrier for the infiltration cobalt powder alloy and a second organic carrier for the base cobalt powder alloy.

18. The method of claim 17, wherein the second organic carrier and base cobalt powder alloy are arranged between the metallic substrate and the first organic carrier and the infiltration cobalt alloy powder.

19. The method of claim 16, wherein the one or more organic carriers comprise polymeric material.

20. The method of claim 15, wherein the average particle size of the base cobalt powder alloy and the infiltration cobalt powder alloy is from 20 μm to 120 μm.

21. The method of claim 15, wherein the composite cladding exhibits a chromium gradient, wherein chromium content increases in a direction from the composite cladding surface to an interface of the composite cladding with the metallic substrate.

22. The method of claim 21, wherein the composite cladding exhibits a tungsten gradient, wherein tungsten content increases in the direction from the composite cladding surface to the interface.

23. The method of claim 15, wherein the composite cladding comprises $M_6C$ carbides dispersed therein, wherein M includes tungsten, molybdenum, cobalt or mixtures thereof.

24. The method of claim 23, wherein the $M_6C$ carbides are present at higher concentration in the composite cladding bulk relative to the composite cladding surface.

25. The method of claim 23, wherein the composite cladding further comprises $Me_7C_3$ carbides, where Me includes chromium, cobalt or mixtures thereof.

26. The method of claim 25, wherein the $M_6C$ carbides and $Me_7C_3$ carbides each have needlelike or irregular morphology.

27. The method of claim 15, wherein the composite cladding has hardness ranging from 400-1000 kg/mm² HV200gf according to ASTM E 384—Standard Methods for Knoop and Vickers Hardness Materials.

28. The method of claim 15, wherein the composite cladding has an abrasion resistance of 30-55 ARF determined according to ASTM G 65 Standard Test Method for Measuring Abrasion Using the Dry Sand/Rubber Wheel, Procedure A (1000/AVL).

29. The method claim 15, wherein the metallic substrate is a frack valve.

30. The method of claim 29, wherein the composite cladding is free of cracks at interfaces with frack valve surfaces.

* * * * *